United States Patent
Mukherjee et al.

(10) Patent No.: US 11,499,731 B2
(45) Date of Patent: Nov. 15, 2022

(54) AUTOMATED MONITORING SYSTEM FOR A FORCED AIR HANDLING SYSTEM AND METHOD OF OPERATION

(71) Applicant: Carrier Corporation, Palm Beach Gardens, FL (US)

(72) Inventors: Kushal Mukherjee, New Delhi (IN); Rohan Chabukswar, Cork (IE); Anarta Ghosh, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 408 days.

(21) Appl. No.: 16/632,033

(22) PCT Filed: Jul. 18, 2018

(86) PCT No.: PCT/US2018/042665
§ 371 (c)(1),
(2) Date: Jan. 17, 2020

(87) PCT Pub. No.: WO2019/018513
PCT Pub. Date: Jan. 24, 2019

(65) Prior Publication Data
US 2020/0149763 A1   May 14, 2020

Related U.S. Application Data

(60) Provisional application No. 62/534,423, filed on Jul. 19, 2017.

(51) Int. Cl.
  *F24F 11/30* (2018.01)
  *F24F 11/74* (2018.01)
  (Continued)

(52) U.S. Cl.
  CPC .............. *F24F 11/30* (2018.01); *F24F 11/74* (2018.01); *F24F 13/10* (2013.01); *G01F 25/10* (2022.01);
  (Continued)

(58) Field of Classification Search
  CPC .. F24F 11/30; F24F 11/74; F24F 13/10; F24F 2110/40; F24F 2140/40; G01F 25/10; F16K 37/0041; F16K 37/005
  See application file for complete search history.

(56) References Cited

U.S. PATENT DOCUMENTS

| | | | | |
|---|---|---|---|---|
| 9,976,763 B2 * | 5/2018 | Leeland | .................. | F24F 11/62 |
| 11,305,881 B2 * | 4/2022 | Peng | ...................... | B64C 27/20 |

(Continued)

FOREIGN PATENT DOCUMENTS

JP    2011043250 A    3/2011

OTHER PUBLICATIONS

ISR for Application No. PCT/US2018/042665 dated Oct. 1, 2018; 6 pages.

(Continued)

*Primary Examiner* — Ramesh B Patel
(74) *Attorney, Agent, or Firm* — Cantor Colburn LLP

(57) ABSTRACT

A forced air handling system includes an automated monitoring system. A method of operating the automated monitoring system includes initiating a calibration mode of operation via a controller. A plurality of dampers may then close via the controller. Once closed, a duct in communication with the plurality of dampers may be pressurized. A first air flow measuring exiting each one of the plurality of dampers may be obtained by a flow sensor. The duct is then depressurized and a second airflow measurement is taken, via the controller, exiting each one of the plurality of dampers. The controller calculates a statistical difference between the first and second airflow measurements.

17 Claims, 5 Drawing Sheets

(51) Int. Cl.
  F24F 13/10 (2006.01)
  G01F 25/00 (2022.01)
  G01F 25/10 (2022.01)
  F24F 140/40 (2018.01)
  F24F 110/40 (2018.01)

(52) U.S. Cl.
  CPC ....... *F24F 2110/40* (2018.01); *F24F 2140/40* (2018.01)

(56) References Cited

U.S. PATENT DOCUMENTS

| | | | | |
|---|---|---|---|---|
| 2004/0072535 | A1* | 4/2004 | Schneider | F24F 11/83 454/229 |
| 2005/0156050 | A1* | 7/2005 | Shah | F24F 3/0442 165/205 |
| 2007/0029282 | A1* | 2/2007 | Hoffman | H01J 37/32935 216/61 |
| 2014/0067135 | A1* | 3/2014 | Lehnert | F24F 11/30 700/276 |
| 2014/0277773 | A1* | 9/2014 | Goldschmidt | G01F 25/10 700/282 |
| 2015/0309120 | A1* | 10/2015 | Bujak, Jr. | F24F 11/62 324/765.01 |
| 2016/0313018 | A1* | 10/2016 | Leeland | F24F 11/30 |
| 2017/0045255 | A1* | 2/2017 | Karamanos | F24F 11/30 |
| 2017/0300045 | A1* | 10/2017 | Florentino | G01N 27/416 |
| 2019/0024921 | A1* | 1/2019 | Simon | F03G 7/06 |

OTHER PUBLICATIONS

Written Opinion for Application No. PCT/US2018/042665 dated Oct. 1, 2018; 8 pages.

* cited by examiner

AUTOMATED MONITORING SYSTEM FOR A FORCED AIR HANDLING SYSTEM AND METHOD OF OPERATION

CROSS-REFERENCE TO RELATED APPLICATIONS

This is a National Stage Application of PCT/US2018/042665, filed Jul. 18, 2018, which claims priority to U.S. Provisional Application No. 62/534,423, filed Jul. 19, 2017, both of which are incorporated herein by reference in their entirety.

BACKGROUND

The present disclosure relates to a forced air handling system, and more particularly, to an automated monitoring system of the forced air handling system and method of operation.

Known forced air handling systems, such as a Heating, Ventilation and Air Conditioning (HVAC) system, may include an air handling unit (AHU) and a plurality of Variable Air Volume (VAV) assemblies each including a damper and at least one sensor for measuring the flow of air through the damper. Each damper may receive air flow from the AHU via a duct arrangement. A controller of the forced air conditioning system may receive signals from the sensors and may thereby distribute and/or control the flow of air through the respective dampers. Monitoring of proper system operation, and maintenance of the system having an abundance of VAV assemblies, is cumbersome and time consuming

BRIEF DESCRIPTION

A method of operating an automated monitoring system of a forced air handling system according to one, non-limiting, embodiment of the present disclosure includes initiating a calibration mode of operation via a controller of the forced air handling system; closing a plurality of dampers of the forced air handling system via the controller; pressurizing a duct of the forced air handling system in communication with the plurality of dampers via the controller; obtaining a first airflow measurement exiting each one of the plurality of dampers by a flow sensor; sending the first airflow measurement to the controller; de-pressurizing the duct via the controller; obtaining a second airflow measurement exiting each one of the plurality of dampers by the flow sensor; sending the second airflow measurement to the controller; and calculating a statistical difference between the first and second airflow measurements by the controller.

Additionally to the foregoing embodiment, the method includes determining that a damper of the plurality of dampers is leaking by the controller if the associated statistical difference is significant.

In the alternative or additionally thereto, in the foregoing embodiment, the method includes determining that the flow sensor requires calibration by the controller if the second airflow measurement is substantially different than zero.

In the alternative or additionally thereto, in the foregoing embodiment, the method includes calibrating the flow sensor if the second airflow measurement is substantially different than zero.

In the alternative or additionally thereto, in the foregoing embodiment, the method includes calibrating the flow sensor if the second airflow measurement is substantially different than zero.

In the alternative or additionally thereto, in the foregoing embodiment, the method includes establishing a sensor offset by the controller if the second airflow measurement is substantially different than zero for use by a balancing module of the forced air handling system.

In the alternative or additionally thereto, in the foregoing embodiment, de-pressurizing the duct is caused by de-energizing a blower of the forced air handling system.

In the alternative or additionally thereto, in the foregoing embodiment, the method includes measuring a pressure differential across each one of the plurality of dampers to confirm no reverse flow of air.

In the alternative or additionally thereto, in the foregoing embodiment, upstream and downstream pressure sensors are positioned upstream and downstream of each one of the plurality of dampers, are configured to send respective upstream and downstream signals to the controller, and the controller is configured to calculate the respective pressure differentials.

In the alternative or additionally thereto, in the foregoing embodiment, the method includes closing a fresh air duct before obtaining the second airflow measurement.

In the alternative or additionally thereto, in the foregoing embodiment, closure of the plurality of dampers is confirmed by a plurality of position sensors each configured to send a position signal associated with a respective damper to the controller.

In the alternative or additionally thereto, in the foregoing embodiment, the first airflow measurement is taken for an extended period of time until the forced air handling system is stabilized.

In the alternative or additionally thereto, in the foregoing embodiment, stabilization of the forced air handling system is determined by the controller via monitoring of the first airflow measurements.

A forced air handling system according to another, non-limiting, embodiment includes a duct; an Air Handling Unit (AHU) in communication with and adapted to pressurize the duct with air; a plurality of Variable Air Volume (VAV) assemblies operably coupled to the duct, each VAV assembly including a damper and an airflow sensor located downstream of the damper; a controller including a processor and an electronic storage medium; and an application stored in the electronic storage medium and executed by the processor, the application including; a command module configured to output commands to close each damper of the plurality of VAV assemblies, and pressurize and de-pressurize the duct via the AHU, and an airflow evaluation module configured to receive a first airflow signal from the airflow sensor when the damper is closed and the duct is pressurized, receive a second airflow signal from the airflow sensor when the damper is closed and the duct is de-pressurized, and determine a statistical difference between the first and second airflow signals for each VAV assembly.

Additionally to the foregoing embodiment, the airflow evaluation module is configured to determine an airflow sensor offset if the second airflow measurement is significantly different than zero.

In the alternative or additionally thereto, in the foregoing embodiment, the airflow evaluation module is configured to determine damper leakage indicative of a significant statistical difference.

In the alternative or additionally thereto, in the foregoing embodiment, the airflow evaluation module outputs the sensor offset to an interface for user notification.

In the alternative or additionally thereto, in the foregoing embodiment, the airflow evaluation module outputs the damper leakage determination to an interface for user notification.

In the alternative or additionally thereto, in the foregoing embodiment, the duct is a supply duct.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
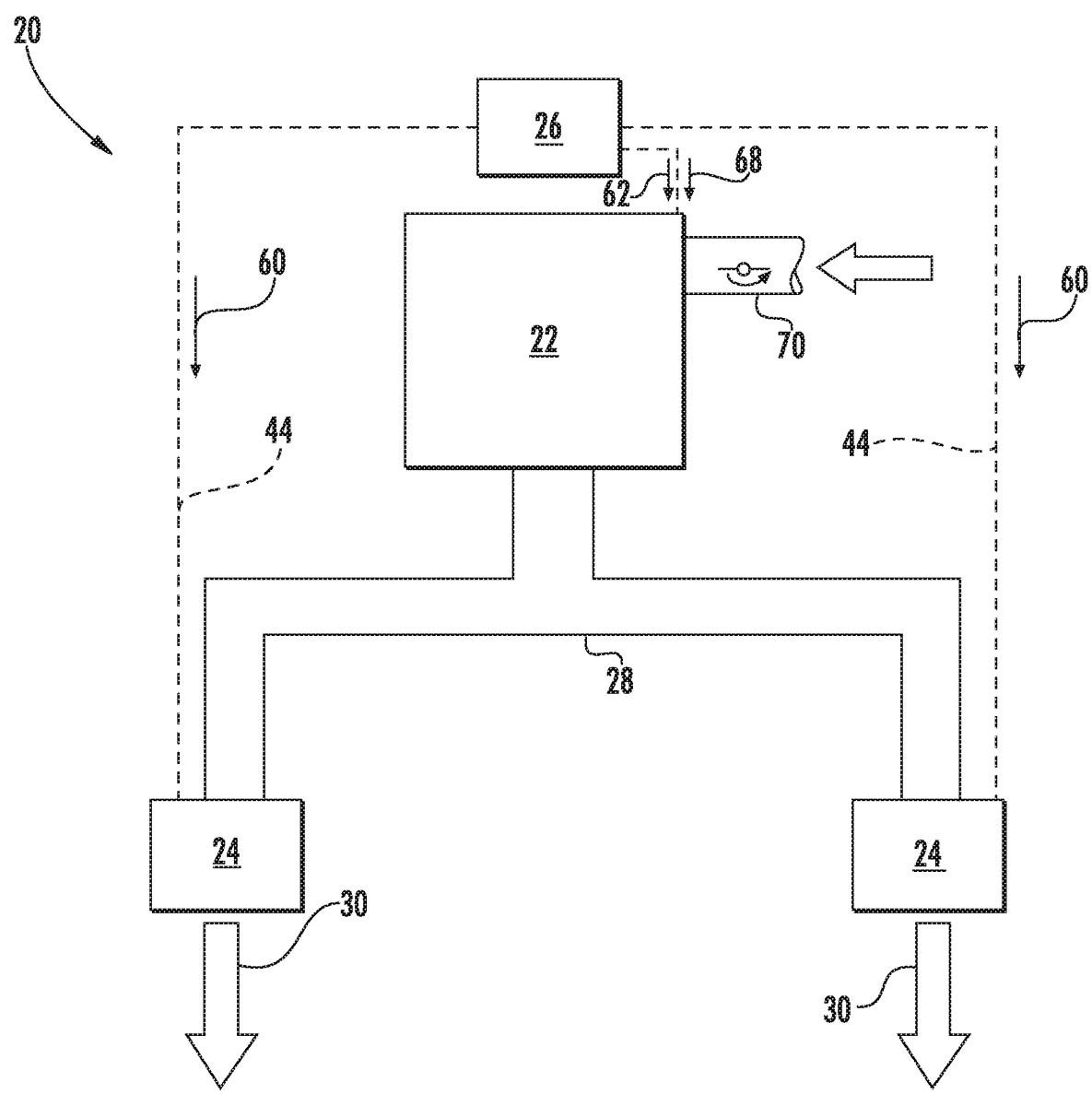
FIG. 1 is a schematic of a forced air handling system as one exemplary embodiment.

Referring to FIG. 1, a forced air handling system 20 may be used in a building having a multitude of areas requiring various air treatments such as increasing air temperature, decreasing air temperature, controlling humidity levels, and others. In one embodiment, the forced air handling system 20 may include an Air Handling Unit (AHU) 22, a plurality of Variable Air Volume (VAV) assemblies 24, a controller 26, and at least one duct 28 for the flow distribution of air. The AHU 22 may be adapted to condition the air (i.e., heat, cool, humidity, etc.) and deliver a volume of air into the duct 28. In one embodiment, the AHU 22 may include a variable speed blower (not shown) configured to generally maintain a predetermined air pressure within the duct 28. One example of a force air handling system 20 may be a Heating, Ventilation and Air Conditioning (HVAC) system. In some embodiments, the forced air handling system 20 may include a return duct (not shown) operably coupled to the AHU 22. A damper 70 may be disposed within the return duct to control airflow into the AHU 22.

Although only two VAV assemblies 24 are illustrated in FIG. 1, in the application of a forced air handling system 20 applied to a building, the forced air handling system 20 may include over one-thousand VAV assemblies 24. Each VAV assembly 24 may be adapted to control a pre-specified volume of air received from the duct 28 and flowing (see arrows 30) into respective areas of the building.

Figure 2:
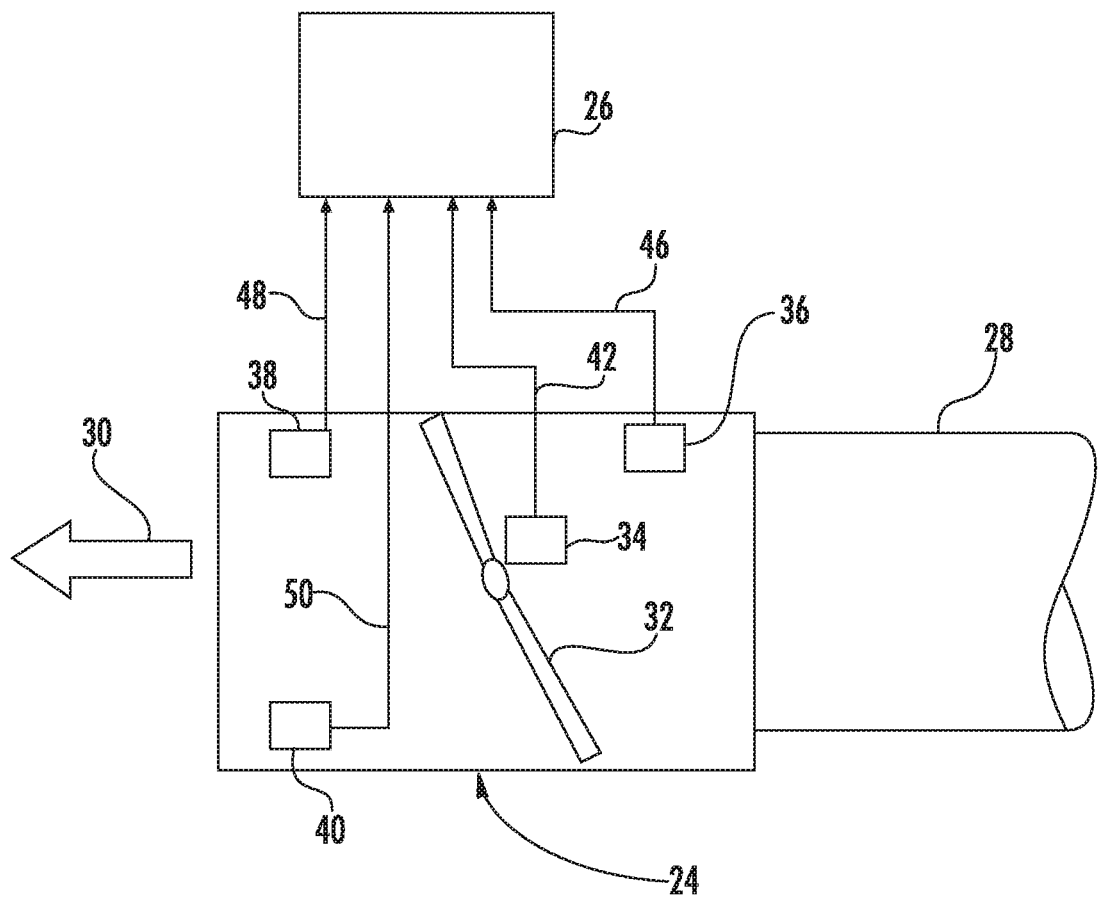
FIG. 2 is a schematic of a variable air volume (VAV) assembly of the forced air handling system.

Referring to FIGS. 1 and 2, each VAV assembly 24 may include a damper 32, a position sensor 34, an upstream pressure sensor 36, a downstream pressure sensor 38, and a flow sensor 40. The damper 32 may generally be in-line with an outlet of the duct 28 as is generally known by one skilled in the art. The position sensor 34 is adapted to measure the position of the damper 32 (i.e., zero to one-hundred percent open), and output a position signal (see arrow 42) over a pathway 44 to the controller 26.

The upstream pressure sensor 36 may be configured to measure the pressure of air immediately upstream of the damper 32 and send an upstream pressure signal (see arrow 46) to the controller 26 over pathway 44. The downstream pressure sensor 38 may be configured to measure the pressure of air immediately downstream of the damper 32 and send a downstream pressure signal (see arrow 48) to the controller 26 over pathway 44. The flow sensor 40 may be generally located downstream of the damper 32, and is configured to measure airflow exiting the damper and sending an airflow signal (see arrow 50) to the controller 26 via the pathway 44. The pathway 44 may be hard wired or wireless.

Figure 3:
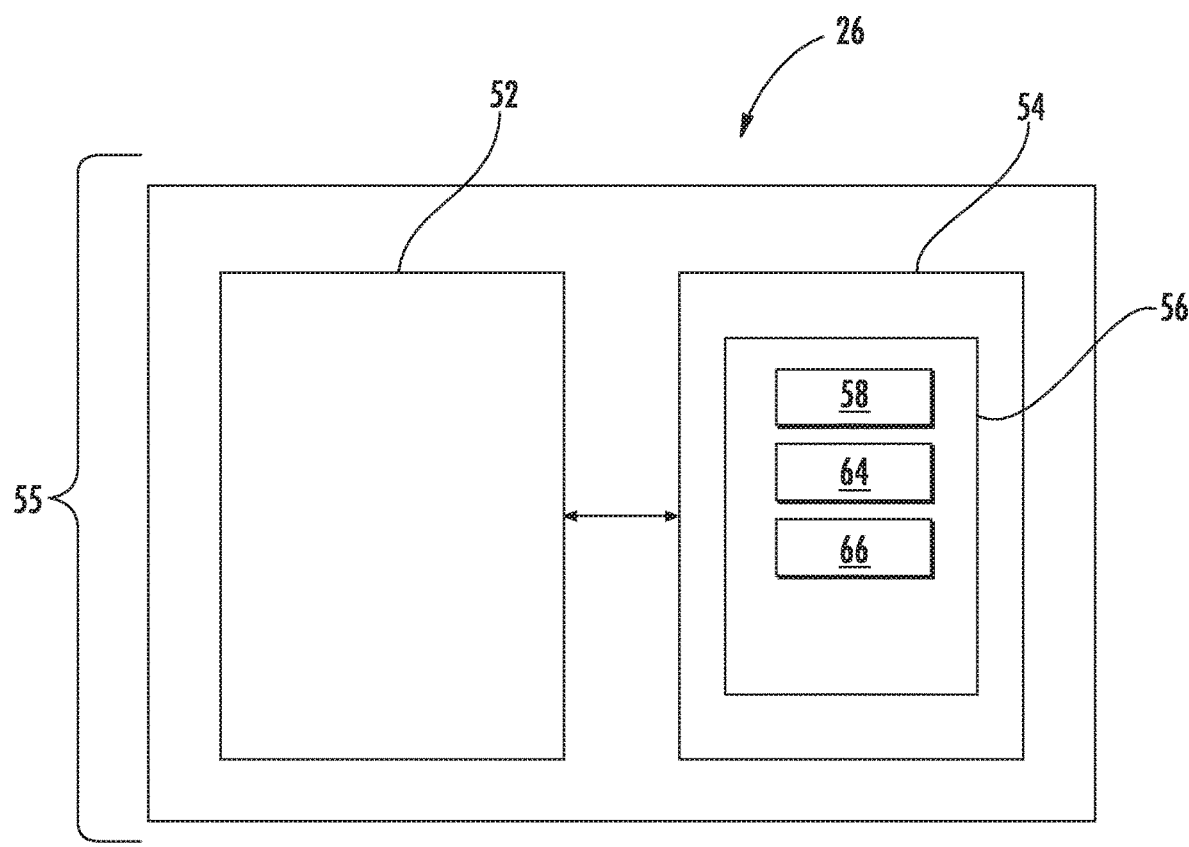
FIG. 3 is a schematic of a controller of the forced air handling system.

Referring to FIGS. 2 and 3, the controller 26 may generally be dedicated toward the forced air handling system 20, or may be part of other systems such as a building management system. The controller 26 may include at least one processor 52 (e.g., microprocessor) and at least one electronic storage medium 54 that may be computer writeable and readable. In one embodiment, the controller 26 is configured to control and/or monitor the AHU 22 and the plurality of VAV assemblies 24.

The forced air handling system 20 further includes an automated monitoring system 55 configured to monitor operations of each VAV assembly 24. For example, the automated monitoring system 55 may be configured to monitor for air leakage past the damper 32 and/or monitor for a need to calibrate the flow sensor 40. In one embodiment, the controller 26 may be configured to store and execute an application 56 of the automated monitoring system 55 that may be software-based. The application 56 may be configured to determine a need for calibration of the flow sensors 40, may determine damper operating problems such as air leakage, and may be further configured to perform automated calibration of, for example, the flow sensors 40. The application 56 may include a command module 58, a stabilization verification module 64, and an airflow evaluation module 66.

Figure 4A:
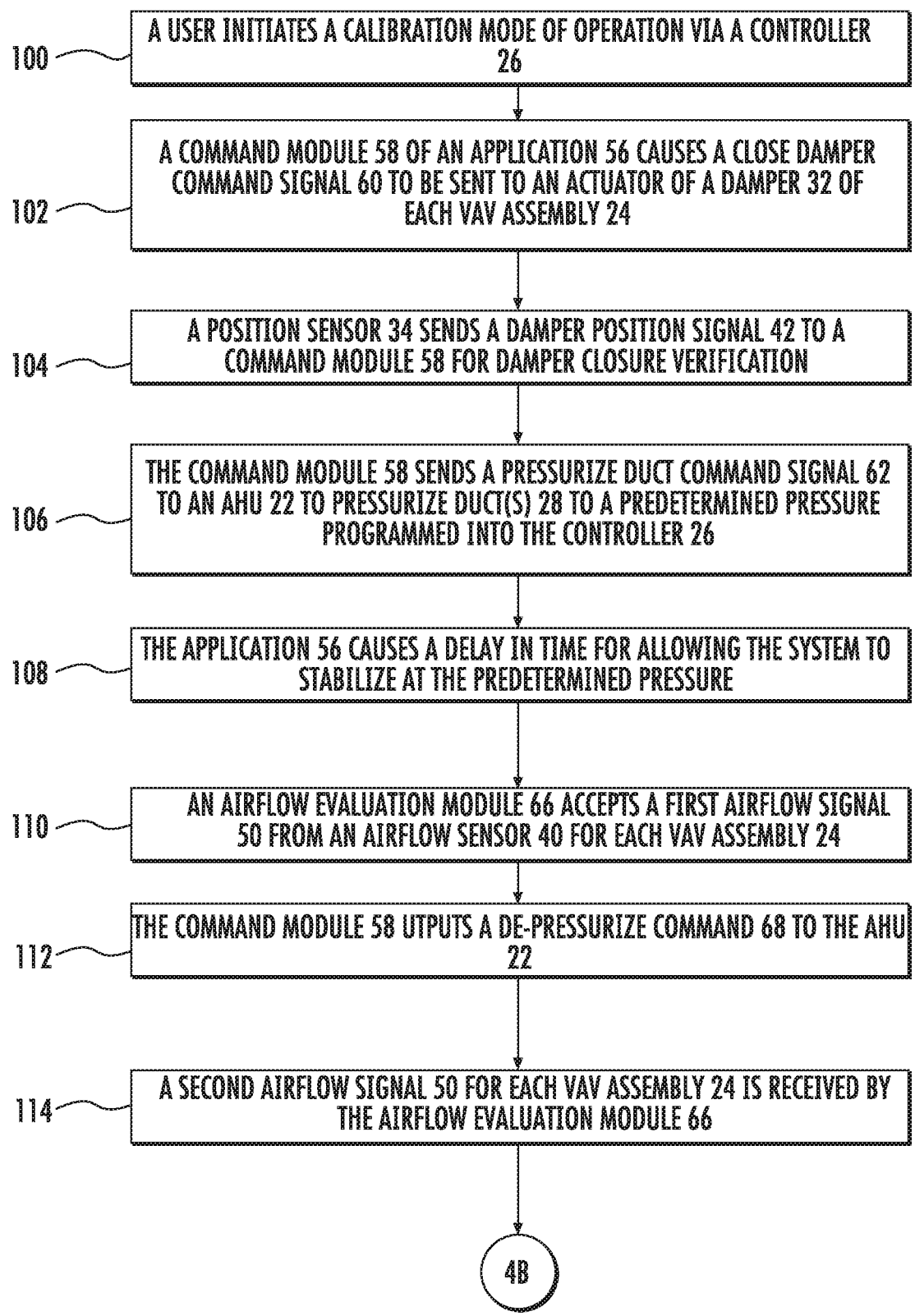
FIGS. 4A and 4B represent a flow chart illustrating a method of monitoring and addressing issues with the VAV assembling.
Figure 4B:
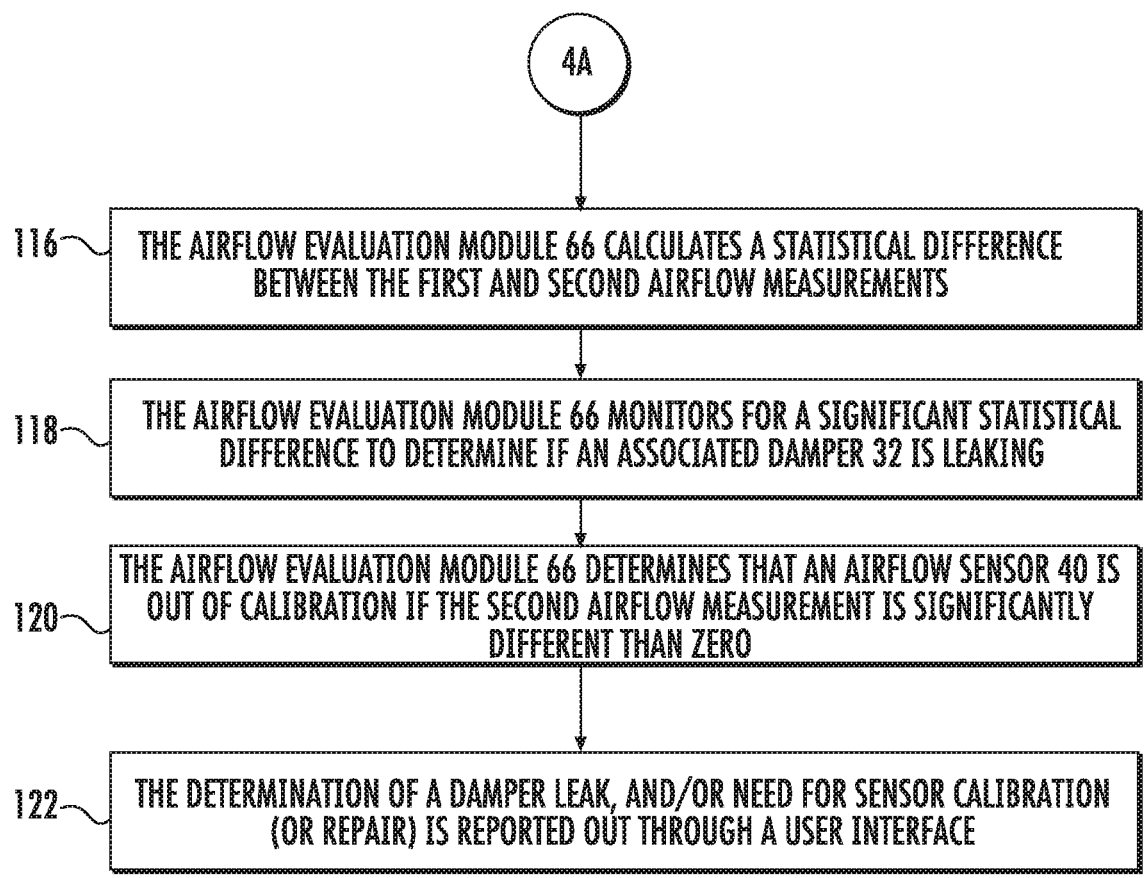

Referring to FIGS. 3, 4A, and 4B, a method of operating the automated monitoring system 55 of the forced air handling system 20 is generally illustrated. At block 100, a user may initiate a calibration mode of operation by utilizing an interface (not shown) associated with the controller 26. More specifically, the processor 52 is instructed to execute the application 56 that may be stored in the medium 54. At block 102, a command module 58 of the application 56 may cause a close damper command signal (see arrow 60 in FIG. 1) to be sent to the actuator or driver of the damper 32 of each VAV assembly 24. At block 104, the position sensor 34 may send the damper position signal 42 (see FIG. 2) to the command module 58 for damper closure verification. Alternatively, the dampers 32 may be presumed to be closed based on the act of the close damper command signal 60 being sent.

At block 106 and with the dampers 32 closed, the command module 58 may then send a pressurize duct command signal (see arrow 62 in FIG. 1) to the AHU 22 to pressurize the duct(s) 28 to a predetermined pressure programmed into the controller 26 and/or application 56. In one example, and for VAV systems, the predetermined pressure may be the same as the normal operating pressure. In one example, the ducts 28 are pressurized by operating a blower assembly (i.e., fan and motor) of the AHU 22. As is generally known in the art, the blower may be a variable speed blower assembly controlled by the controller based on static air pressure readings within the duct 28.

At block 108, the application 56 may generally cause a delay in time before proceeding to the next step in the calibration process, for allowing the system to stabilize at the predetermined pressure. In one embodiment, this delay may be a preprogrammed time period stored in the storage medium 54 as part of the application 56. In another embodiment, the application 56 may include a stabilization verification module 64 configured to receive a plurality of upstream pressure signals 46, each received successively at a predetermined time interval. The stabilization verification module 64 may be configured to determine that the system is stabilized once an absolute difference between successive pressure measurements does not exceed a predetermined threshold. When the stabilization verification module 64 determines that the system is stabilized, the module 64 may communicate this with an airflow evaluation module 66.

At block 110, and after the system has stabilized; the airflow evaluation module 66 may accept, or otherwise receive, a first airflow signal 50 (see FIG. 2) from the airflow sensor 40 for each VAV assembly 24. In another embodiment, the airflow may be determined by other means such as a drop in pressure across the damper 32. At block 112, and after the first airflow signal 50 is received, the command module 58 may output a de-pressurize command (see arrow 68 in FIG. 1) to the AHU 22. The de-pressurize command 68 may cause the blower assembly to shut down. Also, the de-pressurize command 68 may cause the fresh air, or makeup air, damper 70 (see FIG. 1) to close.

At block 114, and with the duct 28 depressurized, the dampers 32 remaining closed, and the fresh air damper 70 closed, a second airflow signal 50 for each VAV assembly 24 may be received by the airflow evaluation module 66. At block 116, and with the first and second airflow signals 50 received, the airflow evaluation module 66 may calculate a statistical difference between the first and second airflow measurements.

At block 118, the airflow evaluation module 66 may be configured to determine that any one, or more, of the plurality of dampers 32 are leaking if the statistical difference is significant. In one embodiment, the airflow evaluation module 66 may apply a threshold value, that if exceeded, amounts to a significant difference. At block 120, the airflow evaluation module 66 may be configured to determine that any one, or more, of the plurality of airflow sensors 40 may be out of calibration, or may have an unexpected sensor offset. The sensor offset may be established by the module 66 if the second airflow measurement for any particular airflow sensor 40 is significantly different than zero. In one embodiment, the airflow evaluation module 66 may apply a threshold value, to determine when a sensor offset should be noted. At block 120, the determination of a damper leak, and/or need for sensor calibration (or repair) may be reported out through a user interface that informs the user of the damper and location of the damper that may be leaking, and the sensor and location of the sensor that may require calibration or maintenance. The term "significant difference" means a difference that is large enough to infer a condition that negatively impacts system operation to a degree that may warrant corrective action.

It will be appreciated that a service repair person may perform any maintenance and/or calibration to the airflow sensor 40. It will further be appreciated that the calibration may be performed by the application 56. That is, the calibration would be software-based (i.e., offset applied to future calculations, etc.). In another embodiment, and when the system is depressurized, the pressure sensors 36, 38 and associated signals 46, 48 may be applied by the application 56 to assure no reverse airflow conditions exist. Such a condition may, for example, be indicative of a failure of the fresh air damper 70.

Advantages and benefits of the present disclosure include an improved diagnostics and control algorithm performance, a reduction is system commissioning time by about fifty percent (50%), greater customer satisfaction via reduced installer expenses and fewer callbacks, and a savings of energy and improved comfort.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block, or combination of blocks, in the flowchart or block diagrams may represent an application, a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an automated monitoring system of a forced air handling system, the method comprising:
    initiating a calibration mode of operation via a controller of the forced air handling system;
    closing a plurality of dampers of the forced air handling system via the controller;
    pressurizing a duct of the forced air handling system in communication with the plurality of dampers via the controller;
    obtaining a first airflow measurement exiting each one of the plurality of dampers by a flow sensor;
    sending the first airflow measurement to the controller;
    de-pressurizing the duct via the controller;
    obtaining a second airflow measurement exiting each one of the plurality of dampers by the flow sensor;
    sending the second airflow measurement to the controller;
    calculating a statistical difference between the first airflow measurement and the second airflow measurement by the controller; and
    determining that a damper of the plurality of dampers is leaking by the controller if the associated statistical difference is significant, wherein the significant statistical difference comprises a difference that is large enough to infer a condition that negatively impacts operation of the forced air system to a degree that warrants corrective action.

2. The method set forth in claim 1, further comprising:
    determining that the flow sensor requires calibration by the controller if the second airflow measurement is substantially different than zero.

3. The method set forth in claim 2, further comprising:
    calibrating the flow sensor if the second airflow measurement is substantially different than zero.

4. The method set forth in claim 1, further comprising:
    calibrating the flow sensor if the second airflow measurement is substantially different than zero.

5. The method set forth in claim 1, further comprising: establishing a sensor offset by the controller if the second airflow measurement is substantially different than zero for use by a balancing module of the forced air handling system.

6. The method set forth in claim 1, wherein de-pressurizing the duct is caused by de-energizing a blower of the forced air handling system.

7. The method set forth in claim 6, further comprising: measuring a pressure differential across each one of the plurality of dampers to confirm no reverse flow of air.

8. The method set forth in claim 7, wherein upstream and downstream pressure sensors are positioned upstream and downstream of each one of the plurality of dampers, are configured to send respective upstream and downstream signals to the controller, and the controller is configured to calculate the respective pressure differentials.

9. The method set forth in claim 1, further comprising: closing a fresh air duct before obtaining the second airflow measurement.

10. The method set forth in claim 1, wherein closure of the plurality of dampers is confirmed by a plurality of position sensors each configured to send a position signal associated with a respective damper to the controller.

11. The method set forth in claim 1, wherein the first airflow measurement is taken for an extended period of time until the forced air handling system is stabilized.

12. The method set forth in claim 11, wherein stabilization of the forced air handling system is determined by the controller via monitoring of the first airflow measurements.

13. A forced air handling system comprising:
a duct;
an Air Handling Unit (AHU) in communication with and adapted to pressurize the duct with air;
a plurality of Variable Air Volume (VAV) assemblies operably coupled to the duct, each VAV assembly including a damper and an airflow sensor located downstream of the damper;
a controller including a processor and an electronic storage medium; and
an application stored in the electronic storage medium and executed by the processor, the application including;
a command module configured to output commands to close each damper of the plurality of VAV assemblies, and pressurize and de-pressurize the duct via the AHU;
an airflow evaluation module configured to receive a first airflow signal from the airflow sensor when the damper is closed and the duct is pressurized, receive a second airflow signal from the airflow sensor when the damper is closed and the duct is de-pressurized, and determine a statistical difference between the first airflow signal and the second airflow signal for each VAV assembly; and
wherein the airflow evaluation module is configured to determine damper leakage indicative of a significant statistical difference comprising a difference that is large enough to infer a condition that negatively impacts operation of the forced air system to a degree that warrants corrective action.

14. The forced air handling system set forth in claim 13, wherein the airflow evaluation module is configured to determine an airflow sensor offset if the second airflow measurement is significantly different than zero.

15. The forced air handling system set forth in claim 14, wherein the airflow evaluation module outputs the sensor offset to an interface for user notification.

16. The forced air handling system set forth in claim 13, wherein the airflow evaluation module outputs the damper leakage determination to an interface for user notification.

17. The forced air handling system set forth in claim 13, wherein the duct is a supply duct.

* * * * *